United States Patent [19]
Posnansky

[11] 4,064,402
[45] Dec. 20, 1977

[54] METHOD AND APPARATUS FOR SUPPRESSING THE VISIBLE RADIATION EMITTED BY A SOURCE OF INFRA-RED RADIATION

[76] Inventor: Mario Posnansky, Pappelweg 4, Ostermundigen, Switzerland, 3072

[21] Appl. No.: 685,022

[22] Filed: May 10, 1976

[30] Foreign Application Priority Data

May 16, 1975    Switzerland ..................... 6340/75

[51] Int. Cl.² .............................................. G01J 1/00
[52] U.S. Cl. .................................. 250/504; 250/495; 350/3
[58] Field of Search ................... 250/338, 504, 495; 313/110, 117; 350/3

[56] References Cited

U.S. PATENT DOCUMENTS

| 2,114,173 | 4/1938 | Boerstler | 350/3 |
| 2,697,789 | 12/1954 | Skarstrom | 350/3 |
| 3,744,423 | 7/1973 | Ertsgaard | 350/3 |
| 3,761,757 | 9/1973 | Muhlbauer | 333/110 |
| 3,914,010 | 10/1975 | Zeller | 350/3 |
| 3,995,934 | 12/1976 | Nath | 250/495 |

*Primary Examiner*—Harold A. Dixon
*Attorney, Agent, or Firm*—Howard C. Miskin

[57] ABSTRACT

Sources of infra-red radiation have the property of emitting besides infra-red radiation also visible radiation which is considered to be disturbing in particular applications; in order to avoid it the visible portion of radiation is absorbed by means of a gas or a gas mixture so that only the infra-red radiation emerges from the source of infra-red radiation.

4 Claims, 5 Drawing Figures

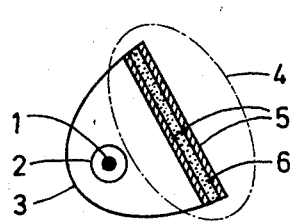 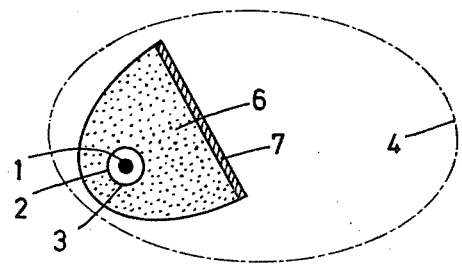
FIG.1  FIG.2
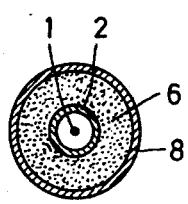 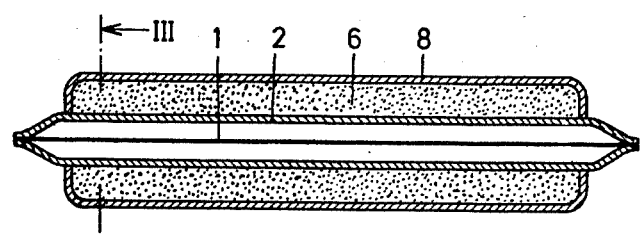
FIG.3  FIG.4
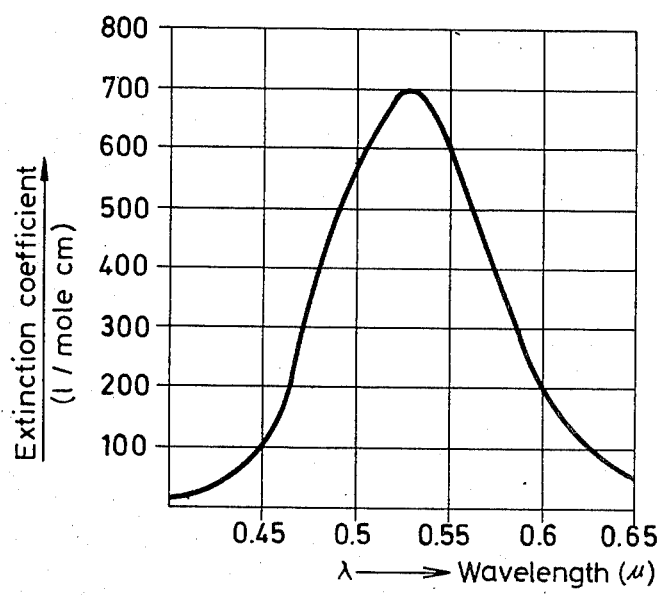
FIG.5

METHOD AND APPARATUS FOR SUPPRESSING THE VISIBLE RADIATION EMITTED BY A SOURCE OF INFRA-RED RADIATION

This invention relates to a method of suppressing the visible portion of the radiation emitted by a source of infrared radiation and to apparatus for carrying out this method.

Infra-red radiation sources are used in many different applications, e.g., for drying, heating, accelerating chemical reactions, etc.

In most cases the visible radiation is in no way disturbing, and it is often even desirable. In one particular application, infra-red radiators are utilized for eliminating fog from airport runways. Since fog possesses favourable absorption properties for very short-wave infra-red radiation, so-called bright radiators are utilized. Because the coils of these radiators are heated to very high temperatures (about 3500° C), a certain proportion of energy is necessarily produced (according to Planck's radiation formula) in the form of visible radiation. According to the temperature of the coil, this proportion may amount to 3 - 10% of the total radiation.

Now in the particular application mentioned above, this visible radiation is disturbing in that, owing to the strong illuminating effect occurring, the human eye adapts to the ambient brightness, so that, for instance, darker objects in the background can no longer be seen. Hence visibility is still greatly impaired despite the elimination of the fog.

Thus the necessity arises for apparatus enabling the visible radiation to be suppressed as completely as possible without, however, diminishing the infra-red radiation.

Until now, it has only been possible to come close to this aim by means of a very great number of thin layers of metal evaporated in vacuo onto the cover glass of the infra-red radiator. The drawbacks of such apparatus are the complexity of the method and the high cost. Because of the great thermal load, provision must be made for large panes of glass, which are expensive, especially if they must be made of quartz glass.

It is an object of this invention to provide a method and apparatus which make it possible to suppress the visible radiation in a simpler and more inexpensive manner.

To this end, in the method according to the present invention, the radiation emitted by the source of radiation is conveyed through a gas or a mixture of gases having an absorption spectrum in the visible wave band.

In the apparatus according to the present invention, the source of infra-red radiation is surrounded at least partially by a gas or a mixture of gases having an absorption spectrum in the visible wave band.

Preferred embodiments of the invention will now be described in detail with reference to the accompanying drawing, in which:

FIG. 1 is a cross-section through a first embodiment of the invention,

FIG. 2 is a cross-section through a second embodiment of the invention,

FIG. 3 is a section taken on the line III—III of FIG. 4,

FIG. 4 is a longitudinal section through a tubular infra-red radiation source surrounded by a further tube containing gas, and FIG. 5 is a graph of the absorption spectrum of gaseous iodine.

FIG. 1 illustrates in cross-section an embodiment of an infra-red radiator comprising a coil 1 having a glass envelope 2 and a reflector 3. Disposed within the range of the emergent radiation is an arrangement 4 for suppressing the visible rays, which arrangement serves simultaneously as a cover. The arrangement 4 comprises two glass panes 5, between which there is a "black" gas or gas mixture 6.

FIG. 2 illustrates in cross-section another embodiment in which the "black" gas or gas mixture 6 is accommodated within the reflector 3, which is hermetically sealed off by a cover glass 7.

FIGS. 3 and 4 illustrate a further embodiment in which a transparent envelope 8 completely surrounds the envelope 2 of the coil 1. Here the "black" gas or gas mixture 6 is accommodated in the space between the two envelopes 2 and 8. The transparent envelope 8 is an outer tube made, for example, of quartz glass, surrounding the tubular envelope 2 of the coil 1, the two tubes 2 and 8 being welded fast to one another. Thus the "black" gas or gas mixture 6 is disposed within the range of the radiation.

It would be conceivable to displace part of the outer envelope 8 with the gas 6 in such a way that it is no longer within the range of the radiation and to fill it or shape it in such a way that a heat exchange with the environment can take place. This may be desirable when excessive heating of the gas, resulting from the absorption, should be avoided. The "black" gas may also be introduced within the envelope 2 of the coil 1.

The search for a suitable "black" gas has led to a choice of various possibilities. A preferred gas is gaseous iodine ($I_2$), discussed in more detail below.

FIG. 5 shows the absorption spectrum of gaseous iodine. It is comprised almost wholly within the visible wave band (0.4 to 0.7 microns). Except for a few fractions of a percent comprised within the visible range, on the other hand, a bright radiator emits chiefly in the wave band between 0.9 and 3 microns, thus in a range in which iodine exhibits no more absorption bands. Hence iodine is very suitable for absorbing, as desired, only the visible portion of the radiation of the bright radiator.

Now in order to be able to judge how thick the layer of gas must be in order to absorb, for example, 99% of the visible energy, Beer's formula may be used:

$$(I/I_o) = e^{-E_n C_n d}$$

wherein $I/I_o$ is the ratio of residual intensity I to initial intensity $I_o$, $E_n$ is the molar extinction coefficient, $C_n$ is the molar concentration of the gas, and $d$ is the thickness of the layer.

Thus at normal pressure ($C_n = (1/22.4)$ moles per liter), the resultant thickness of the layer is: $d = 3$ mm.

Gaseous iodine may also quite well be rarefied, e.g., with air, if it is desired to absorb over a layer thickness of more than 3 mm. Iodine may likewise be put under pressure if it is desired to absorb over layer thicknesses of less than 3 mm.

Iodine is solid at room temperature. If it is heated, however, e.g., by the radiation once the radiator has begun to operate, the desired "black" gas is produced automatically.

If the space within which the iodine is enclosed is hermetically sealed, a pressure according to the vapour-pressure curve of iodine is produced as the temperature rises. Therefore, in order to avoid higher pressures, the amount of iodine, introduced initially in its solid state, for example, must be measured accordingly. Thus when the iodine is totally vapourized, the further increase in pressure as a result of further increased temperature then takes place only in accordance with the gas laws.

Since iodine has a highly corrosive effect upon all sorts of materials, but not upon glass, it is advisable to choose apparatus in which the iodine is enclosed only by glass walls. This is technically quite possible in the embodiments according to FIGS. 1, 3, and 4.

Other "black" gases suitable for the purpose described above are Br or a mixture of I and Br, $N_2O_4$ or $NO_2$, NOCl, ClF, $S_2Cl_2$, $ClF_3$, NBr, BrF, $PCl_5$, and BrF.

Some of these gases, however, have certain disadvantages according to the particular application, e.g., that they decompose at too low a temperature, whereas others, e.g., $NO_2$, have the advantage of being gaseous even at room temperature.

What is claimed is:

1. Apparatus for suppressing the visible portion of the radiation emitted by a source of infra-red radiation comprising a glass tube enclosing said source, at least one transparent envelope surrounding and spaced from said source and a gas or a mixture of gases having an absorption spectrum in the visible wave band enclosed in the space between said glass tube and said envelope.

2. Apparatus in accordance with claim 1, wherein said envelope is tubular and is welded to said glass tube.

3. Apparatus in accordance with claim 2, wherein said enclosed gas contains iodine.

4. Apparatus for suppressing the visible portion of the radiation emitted by a source of infra-red radiation, comprising means for surrounding said source at least partially by a gas or a mixture of gases having an absorption spectrum in the visible wave band, said means comprising two panes of glass between which said gas or gases are accommodated, said panes of glass serving as a cover for said source.

* * * * *